(12) United States Patent
Pessoa et al.

(10) Patent No.: US 8,032,030 B2
(45) Date of Patent: Oct. 4, 2011

(54) MULTIPLE CORE SYSTEM

(75) Inventors: Lucio F. C. Pessoa, Cedar Park, TX (US); Perry H. Pelley, III, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 716 days.

(21) Appl. No.: 12/130,184

(22) Filed: May 30, 2008

(65) Prior Publication Data

US 2009/0297146 A1 Dec. 3, 2009

(51) Int. Cl.
*H04B 10/00* (2006.01)
(52) U.S. Cl. ........................................ 398/115; 398/164
(58) Field of Classification Search .......... 398/115–118, 398/164
See application file for complete search history.

(56) References Cited

U.S. PATENT DOCUMENTS

| | | |
|---|---|---|
| 4,330,870 A | 5/1982 | Arends |
| 5,321,542 A | 6/1994 | Freitas et al. |
| 5,561,846 A | 10/1996 | Hagio |
| 5,598,290 A | 1/1997 | Tanaka et al. |
| 5,619,361 A | 4/1997 | Sagesaka et al. |
| 5,638,052 A | 6/1997 | Furuya et al. |
| 5,639,989 A | 6/1997 | Higgins, III |
| 5,696,500 A | 12/1997 | Diem |
| 6,236,223 B1 | 5/2001 | Brady et al. |
| 6,271,815 B1 | 8/2001 | Yang et al. |
| 6,307,169 B1 | 10/2001 | Sun et al. |
| 6,307,452 B1 | 10/2001 | Sun |
| 6,362,018 B1 | 3/2002 | Xu et al. |
| 6,384,353 B1 | 5/2002 | Huang et al. |
| 6,410,941 B1 | 6/2002 | Taylor et al. |
| 6,411,111 B1 | 6/2002 | Gao et al. |
| 6,441,449 B1 | 8/2002 | Xu et al. |
| 6,445,369 B1 | 9/2002 | Yang et al. |
| 6,459,344 B1 | 10/2002 | Pavio et al. |
| 6,590,410 B2 | 7/2003 | Hirt |

(Continued)

FOREIGN PATENT DOCUMENTS

EP 1564914 B1 10/2003

(Continued)

OTHER PUBLICATIONS

USPTO Office Action for related U.S. Appl. No. 12/130,173 mailed May 4, 2009.

(Continued)

*Primary Examiner* — Leslie Pascal
(74) *Attorney, Agent, or Firm* — James L. Clingan, Jr.; Joanna G. Chiu

(57) ABSTRACT

An integrated circuit has a group of cores that communicate with a packet switch using carrierless ultra wideband (UWB) radio frequency (RF) signaling. The packet switch communicates outside the integrated circuit using optical signaling. The carrierless UWB provides for high frequency communication and processing without requiring additional space for interconnects. No special paths are necessary because the signals used by the cores for communicating with the packet switch are RF signals therefore they can be broadcast by the packet switch and be received by a plurality of cores. No conductor line or waveguide is required. Because the signals are carrierless, they can be transmitted with low power. With multiple cores providing information to the switch, the total information being received may exceed the capacity of the RF bandwidth so an external optical interface is provided to multiplex information provided via carrierless UWB RF signals by a plurality of cores.

20 Claims, 3 Drawing Sheets

U.S. PATENT DOCUMENTS

| | | | |
|---|---|---|---|
| 6,717,430 | B2 | 4/2004 | Burch |
| 6,815,973 | B1 | 11/2004 | Conn |
| 6,830,221 | B1 | 12/2004 | Janson et al. |
| 6,842,144 | B2 | 1/2005 | Guo et al. |
| 6,845,670 | B1 | 1/2005 | McNeil et al. |
| 6,870,444 | B1 | 3/2005 | Zurcher et al. |
| 6,885,202 | B2 | 4/2005 | Slupsky |
| 6,891,991 | B2 | 5/2005 | Klosowiak et al. |
| 6,897,663 | B1 | 5/2005 | Conn |
| 6,921,975 | B2 | 7/2005 | Leal et al. |
| 6,936,942 | B1 | 8/2005 | Okazaki et al. |
| 6,953,994 | B2 | 10/2005 | Kaewell, Jr. |
| 6,995,889 | B2 | 2/2006 | Li et al. |
| 7,020,400 | B2 | 3/2006 | Trezza et al. |
| 7,057,518 | B2 | 6/2006 | Schmidt |
| 7,109,460 | B2 | 9/2006 | Diamanstein et al. |
| 7,121,141 | B2 | 10/2006 | McNeil |
| 2003/0056196 | A1 | 3/2003 | Kim et al. |
| 2004/0008142 | A1 | 1/2004 | Guo et al. |
| 2004/0008992 | A1 | 1/2004 | Nishimura |
| 2004/0100376 | A1 | 5/2004 | Lye et al. |
| 2004/0164760 | A1 | 8/2004 | Moore |
| 2005/0070226 | A1 | 3/2005 | Rigge |
| 2005/0073045 | A1 | 4/2005 | Kaewell, Jr. |
| 2005/0075080 | A1 | 4/2005 | Zhang |
| 2005/0130698 | A1 | 6/2005 | Won |
| 2005/0138499 | A1 | 6/2005 | Pileggi et al. |
| 2005/0232638 | A1 | 10/2005 | Fucile et al. |
| 2005/0253225 | A1 | 11/2005 | Kaewell, Jr. |
| 2005/0285541 | A1 | 12/2005 | LeChevalier |
| 2006/0048006 | A1 | 3/2006 | Lou |
| 2006/0056855 | A1 | 3/2006 | Nakagawa et al. |
| 2006/0172719 | A1 | 8/2006 | Chen et al. |
| 2006/0179374 | A1 | 8/2006 | Noble |
| 2007/0091814 | A1 | 4/2007 | Leung et al. |
| 2007/0182438 | A1 | 8/2007 | Khandros et al. |
| 2007/0300125 | A1 | 12/2007 | Xia et al. |
| 2008/0130689 | A1* | 6/2008 | Kumar et al. ............. 370/498 |
| 2008/0204055 | A1 | 8/2008 | Pagani |
| 2009/0297146 | A1 | 12/2009 | Pessoa et al. |

FOREIGN PATENT DOCUMENTS

| | | |
|---|---|---|
| WO | 9942984 | 8/1999 |
| WO | 9942985 | 8/1999 |
| WO | 9949435 | 9/1999 |

OTHER PUBLICATIONS

Office Action mailed Dec. 3, 2009 on Related U.S. Appl. No. 12/130,173.

U.S. Appl. No. 12/130,173 Office Action, mailed Jun. 10, 2010.

U.S. Appl. No. 12/130,173 Notice of Allowance, mailed Aug. 25, 2010.

U.S. Appl. No. 12/130,173, Lucio F.C. Pessoa, et al., Testing of Multiple Integrated Circuits, filed May 30, 2008, Related Application Office Action—Rejection, mailed Dec. 9, 2010.

Bansal, R., Near-Field Magnetic Communication, IEEE Antennas and Propagation Magazine, vol. 46, No. 2, Apr. 2004, pp. 14-15.

Bravo, D., et al., Estimation of the Signal-to-Noise Ratio for On-Chip Wireless Clock Signal Distribution, 2000, p. 9-11.

Brown, E.R., "RF-MEMS Switches for Reconfigurable Integrated Circuits", IEEE Transactions on Microwave Theory and Techniques, vol. 46, No. 11, Nov. 1998, pp. 1868-1879.

Chang, M.F., et al., "Advanced RF/Baseband Interconnect Schemes for Inter- and Intra-ULSI Communications", IEEE Transactions on Electron Devices, vol. 52, No. 7, Jul. 2005, pp. 1271-1285.

Chang, M.F., et al., "Multi-I/O and Reconfigurable RF/Wireless Interconnect Based on Near Field Capacitive Coupling and Multiple Access Techniques", IEEE International Interconnect Technology Conference, 2000, pp. 21-22.

Chang, M.F., et al., "RF/Wireless Interconnect for Inter- and Intra-Chip Communications", Proceedings of the IEEE, vol. 89, No. 4, Apr. 2001, pp. 456-466.

Chen, G., et al., "Electrical and Optical On-Chip Interconnects in Scaled Microprocessors", IEEE International Symposium on Circuits and Systems, vol. 3, 2005, pp. 2514-2517.

Ciattaglia, M., et al., "Investigation on Antenna Coupling in Pulsed Arrays", IEEE Transactions on Antennas and Propagation, vol. 54, No. 3, Mar. 2006, pp. 835-843.

Djahani, P., et al., "Analysis of Infrared Wireless Links Employing Multibeam Transmitters and Imaging Diversity Receivers", IEEE Transactions on Communications, vol. 48, No. 12, Dec. 2000, pp. 2077-2088.

Du Plessis, M., et al., "Spatial and Intensity Modulation of Light Emission from a Silicon LED Matrix", IEEE Photonics Technology Letters, vol. 14, No. 6, Jun. 2002, pp. 768-770.

Floyd, B.A., et al., "Intra-Chip Wireless Interconnect for Clock Distribution Implemented with Integrated Antennas, Receivers, and Transmitters", IEEE Journal of Solid-State Circuits, vol. 37, No. 5, May 2002, pp. 543-552.

Goodman, J.W., et al., "Optical Interconnections for VLSI Systems", Proceedings of the IEEE, vol. 72, No. 7, Jul. 1984, pp. 850-866.

Guo, X., et al., "Propagation Layers for Intra-Chip Wireless Interconnection Compatible with Packaging and Heat Removal", IEEE Symposium on VLSI Technology Digest of Technical Papers, 2002, pp. 36-37.

Havemann, R.H., "High-Performance Interconnects: An Integration Overview", Proceedings of the IEEE, vol. 89, No. 5, May 2001, pp. 586-601.

Sponsor: Test Technology Standards Committee of the IEEE Computer Society, "IEEE Standard Test Access Port and Boundary-Scan Architecture", IEEE Std. 1149.1 TM-2001 (R2008) (revision of IEEE Std. 1149.1-1990); Reaffirmed Mar. 27, 2008, Approved Jun. 14, 2001, 208 pgs.

ITRS, "International Technology Roadmap for Semiconductors, 2005 Edition, Interconnect", 64 pgs.

Jalali, B., et al., "Silicon Photonics", IEEE Microwave Magazine, Jun. 2006, pp. 58-68.

Kahn, J.M., et al., "Imaging Diversity Receivers for High-Speed Infrared Wireless Communication", IEEE Communications Magazine, Dec. 1998, pp. 88-94.

Kim, K., et al., "On-Chip Wireless Interconnection with Integrated Antennas" IEEE International Electron Devices Meeting, IEDM Technical Digest, 2000, pp. 485-488.

Komine, T., et al., "Fundamental Analysis for Visible-Light Communication System using LED Lights", IEEE Transactions on Consumer Electronics, vol. 50, No. 1, Feb. 2004, pp. 100-107.

Lucyszyn, S., "Review of radio frequency microelectromechanical systems technology", IEEE Proc.-Sco. Meas. Technol. vol. 151, No. 2, Mar. 2004, pp. 93-103.

Meuris, P., et al., "Strategy for Electromagnetic Interconnect Modeling", IEEE Transactions on Computer-Aided Design of Integrated Circuits and Systems, vol. 20, No. 6, Jun. 2001, pp. 753-762.

Miller, D.A.B., et al., "Limit to the Bit-Rate Capacity of Electrical Interconnects from the Aspect Ratio of the System Architecture", Journal of Parallel and Distributed Computing, vol. 41, Oct. 1996, pp. 45-52.

Miller, D.A.B., "Rationale and Challenges for Optical Interconnects to Electronic Chips", Proceedings of the IEEE, vol. 88, No. 6, Jun. 2000, pp. 728-749.

Petit, L., "MEMS-Switched Parasitic-Antenna Array for Radiation Pattern Diversity", IEEE Transactions on Antennas and Propagation, vol. 54, No. 9, Sep. 2006, pp. 2624-2631.

Saha, P.K., et al., "A CMOS UWB Transmitter for Intra/Inter-chip Wireless Communication", ISSSTA2004, Sydney, Australia, Aug. 30-Sep. 2, 2004, IEEE, pp. 962-966.

Saraswat, K.C., et al., "Effect of Scaling of Interconnections on the Time Delay of VLSI Circuits", IEEE Transactions on Electron Devices, vol. ED-29, No. 4, Apr. 1982, pp. 645-650.

Schoebel, J., "Design Considerations and Technology Assessment of Phased-Array Antenna Systems With RF MEMS for Automotive Radar Applications", IEEE Transactions on Microwave Theory and Techniques, vol. 53, No. 6, Jun. 2005, pp. 1968-1975.

Schoenmaker, W., et al., "Electromagnetic Interconnects and Passives Modeling: Software Implementation Issues", IEEE Transactions on Computer-Aided Design of Integrated Circuits and Systems, vol. 21, No. 5, May 2002, pp. 534-543.

Sun, M., et al., "Performance of Inter-Chip RF-Interconnect Using CPW, Capacitive Coupler, and UWB Transceiver", IEEE Transactions on Microwave Theory and Techniques vol. 53, No. 9, Sep. 2005, pp. 2650-2655.

Yang, L., et al., "Ultra-Wideband Communications", IEEE Signal Processing Magazine, Nov. 2004, pp. 26-54.

Zhang, Y.P., "Bit-Error-Rate Performance of Intra-Chip Wireless Interconnect Systems", IEEE Communications Letters, vol. 8, No. 1, Jan. 2004, pp. 39-41.

International Telecommunication Union (ITU), "ITU-T, G.984.1, Gigabit-capable Passive Optical Networks (GPON): General characteristics", Series G: Transmission Systems and Media, Digital Systems and Networks, Digital sections and digital line system—Optical line systems for local and access networks, Mar. 2003, 22 pgs.

International Telecommunication Union (ITU), "ITU-T, G.984.2, Gigabit-capable Passive Optical Networks (GPON): Physical Media Dependent (PMD) layer specification", Series G: Transmission Systems and Media, Digital Systems and Networks, Digital sections and digital line system—Optical line systems for local and access networks, Mar. 2003, 38 pgs.

International Telecommunication Union (ITU), "ITU-T, G.984.3, Gigabit-capable Passive Optical Networks (GPON): Transmission convergence layer specification", Series G: Transmission Systems and Media, Digital Systems and Networks, Digital sections and digital line system—Optical line systems for local and access networks, Feb. 2004, 116 pgs.

International Telecommunication Union (ITU), "ITU-T, G.984.4, Gigabit-capable Passive Optical Networks (GPON): ONT management and control interface specification", Series G: Transmission Systems and Media, Digital Systems and Networks, Digital sections and digital line system—Optical line systems for local and access networks, Jun. 2004, 114 pgs.

Luxtera Website, Optical Interconnects, Luxtera optical technology; Fiber will Display Copper Sooner Than you Think, 2005.

Yayla, Speed and Energy Analysis of Digital Interconnects: Comparison of on-chip, off-chip, and free-space technologies, Applied Optics, vol. 37, No. 2, p. 205-227, Jan. 10, 1998.

U.S. Appl. No. 12/130,173, Lucio F.C. Pessoa, et al., Testing of Multiple Integrated Circuits, filed May 30, 2008, Related Application Office Action—Notice of Allowance, mailed Apr. 12, 2011.

* cited by examiner

MULTIPLE CORE SYSTEM

CROSS-REFERENCE TO RELATED APPLICATION(S)

This application is related to U.S. patent application Ser. No. 12/130,173, filed on even date, entitled "Testing of Multiple Integrated Circuits," naming Lucio F. C. Pessoa as inventor, and assigned to the current assignee hereof.

BACKGROUND

1. Field

This disclosure relates generally to integrated circuits, and more specifically, to testing integrated circuits.

2. Related Art

Multiple core systems have been found to provide better processing power than a single core of the same size. In terms of processing power for a given area, it generally increases with the number of cores. As the number of cores increases, however, the amount of interconnect increases at an even greater rate. Thus, there is typically a judgment with regard to beneficially increasing processing power which causes the detrimental affect of increasing the amount of wiring.

Accordingly, there is a need to have multiple cores while eliminating or reducing the detrimental affect of increased wiring.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, an integrated circuit has a group of cores that communicate with a packet switch using carrierless ultra wideband (UWB) radio frequency (RF) signaling. The packet switch communicates outside the integrated circuit using optical signaling. The carrierless UWB provides for high frequency communication and processing without requiring additional space for interconnects. Also no special paths are necessary because the signals used by the cores for communicating with the packet switch, as well as with other cores, are RF signals. Therefore they can be broadcast by the packet switch and be received by a plurality of cores. That is, no conductor line or waveguide is required. Because the signals are carrierless they can be transmitted with low power. But with multiple cores providing information to the switch the total information being received by the switch may exceed the capacity of the RF bandwidth so an external optical interface is provided to multiplex information provided via carrierless UWB RF signals by a plurality of cores. This is better understood by reference to the drawings and following description.

Figure 1:
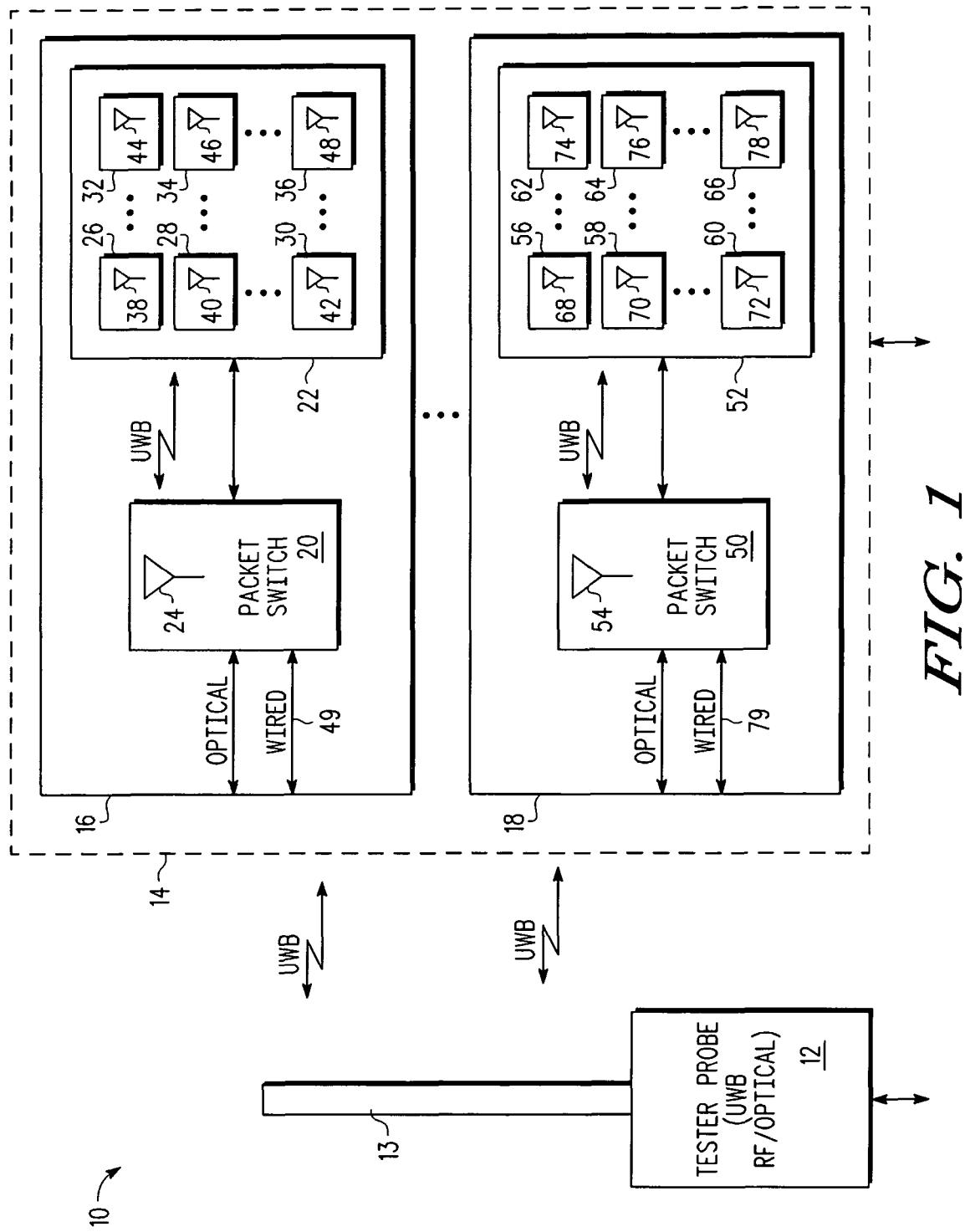
FIG. 1 is a diagram of a system according to an embodiment.

Shown in FIG. 1 is a system 10 comprising a tester probe 12, and a completed semiconductor system 14 which may be a wafer and called wafer 14. Completed wafer 14 comprises a plurality of integrated circuits including integrated circuits 16 and 18. Integrated circuit 16 comprises a packet switch 20 and a core group 22. Core group 22 comprises a plurality of cores including a core 26, core 28, core 30, core 32, core 34, and a core 36. Cores 26, 28, 30, 32, 34, and 36 include antennas, 38, 40, 42, 44, 46, and 48, respectively. Integrated circuit 16 includes a wired input/output 49. Integrated circuit 18 has the same components as integrated circuit 16. Integrated circuit 18 comprises a packet switch 50 and a core group 52. Core group 52 comprises a plurality of cores including a core 56, core 58, core 60, core 62, core 64, and a core 66. Cores 56, 58, 60, 62, 64, and 66 include antennas, 68, 70, 72, 74, 76, and 78, respectively. Integrated circuit 18 includes a wired input/output 79. Tester probe 12 includes an antenna structure 13.

In a test mode, tester probe 12 outputs a carrierless UWB RF signal that includes test instructions using antenna structure 13. Antenna structure 13 may include more than one antenna. The test instructions are received by the integrated circuits of completed wafer 14 including integrated circuits 16 and 18. In particular, antennas 24 and 54 receive the test signals. Packet switch 20 interprets the test signals and transmits corresponding core test signals, as a carrierless UWB RF signal, using antenna 24 to antennas 38-48. Cores 26-36 perform tests according to the core test signals received by antennas 38-48, respectively. Similarly, packet switch 50 interprets the test signals and transmits corresponding core test signals as a carrierless UWB RF signal using antenna 54 to antennas 68-78. Cores 56-66 perform tests according to the core test signals received by antennas 68-78, respectively. Cores 26-36 communicate results, as a carrierless UWB RF signal, of running the tests to packet switch 20 from antennas 38-48 to antenna 24. Similarly, cores 56-66 communicate results, as a carrierless UWB RF signal, of running the tests to packet switch 50 from antennas 68-78 to antenna 54. Packet switch 20 provides the results external to integrated circuit 16 by carrierless UWB RF, wired, and/or optical signaling. Similarly, packet switch 50 provides the results external to integrated circuit 18 by carrierless UWB RF, wired, and/or optical signaling. For test results, it is likely that the bandwidth requirements for the data may be met by all of the following three options: carrierless UWB RF, wired, and optical signaling. In the case of using carrierless UWB RF, each of packet switches 20 and 50 may include a code unique for each integrated circuit so that tester probe can determine which results apply to which integrated circuit. Also power will likely be increased over that for communicating among the cores. Thus, the result is that multiple integrated circuits can simultaneously be tested. Further these tests are not functionally limited by physical contact probes which introduce capacitance and require probe pads on the integrated circuit. Thus, the integrated circuits may be fully tested. This can allow for shipping fully tested wafers, even after wafer level burn-in. It can also allow for testing or debugging of integrated circuits within their packages during normal operation. For example, debugging application software of a complex system that is executed by one or more cores can be performed much more effectively as the tester probe has a large capacity for communicating debugging information to/from the one or more cores.

Integrated circuits 16 and 18, if they pass the tests, may be singulated and packaged and included in a processing system. In normal operation of integrated circuit 16, for example, core group 22 performs processor operations as a multicore system. Cores 26-36 communicate among themselves by carrierless UWB RF using antennas 38-48 and communicate with packet switch 20 also by carrierless UWB RF. Antennas 38-48 within integrated circuit 16 also allow for testing or debugging during normal operation. Core group 22 can have a very large number of cores generating information that is communicated to packet switch 20. Thus, the information being transmitted to packet switch 20 can be so large that the capacity of the carrierless UWB RF bandwidth may be exceeded. Packet switch 20 has an optical interface that has a much greater capacity, typically more than an order of magnitude, than carrierless UWB RF.

Carrierless UWB RF is very convenient for communicating with and among cores. Carrierless UWB RF is a type of UWB RF. UWB RF can be broadcast over circuitry without disturbing the circuitry because it is spread over a wide frequency range. The affect is that no single frequency band has enough energy to disturb circuitry. Carrierless UWB RF does this as well but with a further benefit of not needing to generate a high frequency signal for a carrier. Generating a carrier typically requires precision circuitry for generating a sinusoidal signal at high frequency. Such a circuit requires much power and sophisticated circuitry for maintaining the required tight control of the frequency. Accordingly, carrierless UWB RF, which may use impulses for identifying logic highs and logic lows. An impulse, in the frequency domain, has its energy spread over a wide frequency range and so is perceived as low energy noise by other circuitry. Of course in practice a perfect impulse is not possible, but the technology has developed so that the frequency range does extend into the RF range. Thus, these impulses may be transmitted from an antenna as an electromagnetic wave and received by another antenna. A logic high may be distinguished from a logic low by the impulse having its leading edge be positive going or negative going. This may also be considered changing the phase of the impulse. Thus, under one convention, an impulse whose leading edge is positive going can be considered a logic high and an impulse whose leading edge is negative going can be considered a logic low. Another convention is to use one short train of impulses for one logic state and a different short train of impulses be the other logic state. By using impulses applied to antennas that broadcast the carrierless UWB RF, data is transferred among cores without requiring wiring to communicate among cores. Because the signal is in the RF range, the signal does not require a dedicated line, be it wire or waveguide, to pass from packet switch 20 and cores 26-36 or from cores 26-36 to packet switch 20. The power used controls the distance over which the carrierless UWB RF is effective. Thus, cores 26-36 of core group 22 are designed to have enough power to reach packet switch 20 but not to extend outside of integrated circuit 16. Packet switch 20 may have multiple antennas located in proximity to the various cores to achieve the needed information transfer while keeping power low. By using carrierless UWB RF, there is no, or at least a significantly reduced, wiring needed for carrying signals among the cores and between the cores and packet switch 20. Further the power is significantly reduced with respect to conventional wiring interconnects. One reason is that the data being generated is simply an impulse or series of impulses for defining the logic state of a signal so nearly all of the power is the impulse itself. Also, the power requirement is very low when data is being generated, especially when compared to RF that requires a carrier because there is then an oscillator operating even if no data is being transferred. Using packet technology, packet switch 20 can accumulate packet data from cores 26-36, for example, and then send out completed data assembled from the packet data.

Figure 2:
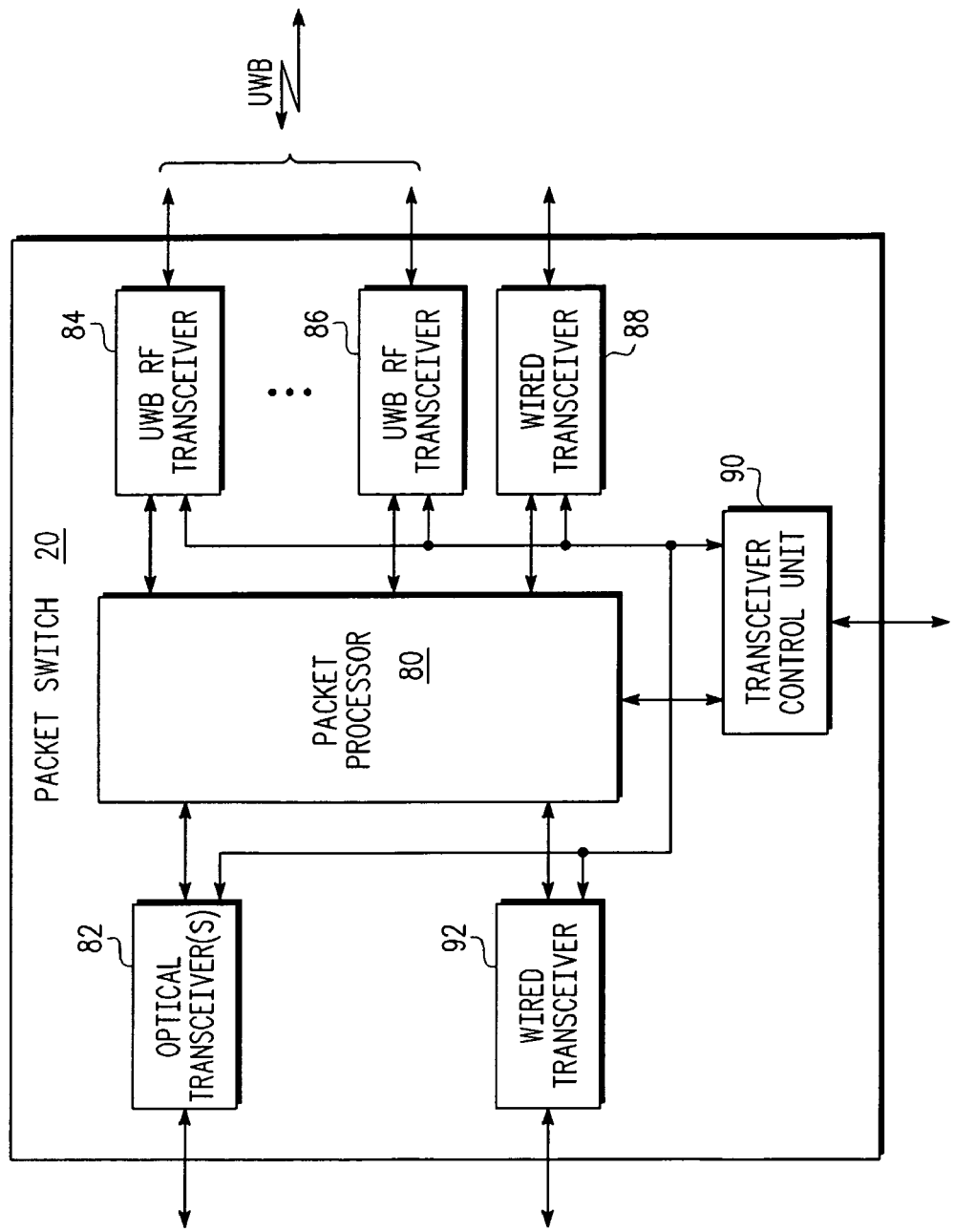
FIG. 2 is a block diagram of a packet switch shown in FIG. 1.

Shown in FIG. 2 is packet switch 20 in more detail. As shown in FIG. 2, packet switch 20 comprises a packet processor 80, an optical transceiver 82, a carrierless UWB RF transceiver 84, a carrierless UWB RF transceiver 86, a wired transceiver 88, a transceiver control unit 90, and a wired transceiver 92. Optical transceiver may include multiple transceivers. Optical transceiver 82 is for providing an external interface for integrated circuit 16 that has an exceptionally high capacity. Optical data rates are currently available at up to terabits (10 to the twelfth bits) per second. Carrierless UWB RF transceivers 84 and 86 are used for communicating with cores 26-36 using carrierless UWB RF and for communicating outside of integrated circuit 16 using carrierless UWB RF. For transmissions outside of integrated circuit 16, the power may be increased. Wired transceiver 88 provides for communicating with cores 26-36 using conventional conductor interconnect. Transceiver control unit 90 is for communicating with a high level controller that may either be in integrated circuit 16 or outside integrated circuit 16. Wired transceiver 92 is for general wired communication between packet processor 80 and resources outside integrated circuit 16.

Figure 3:
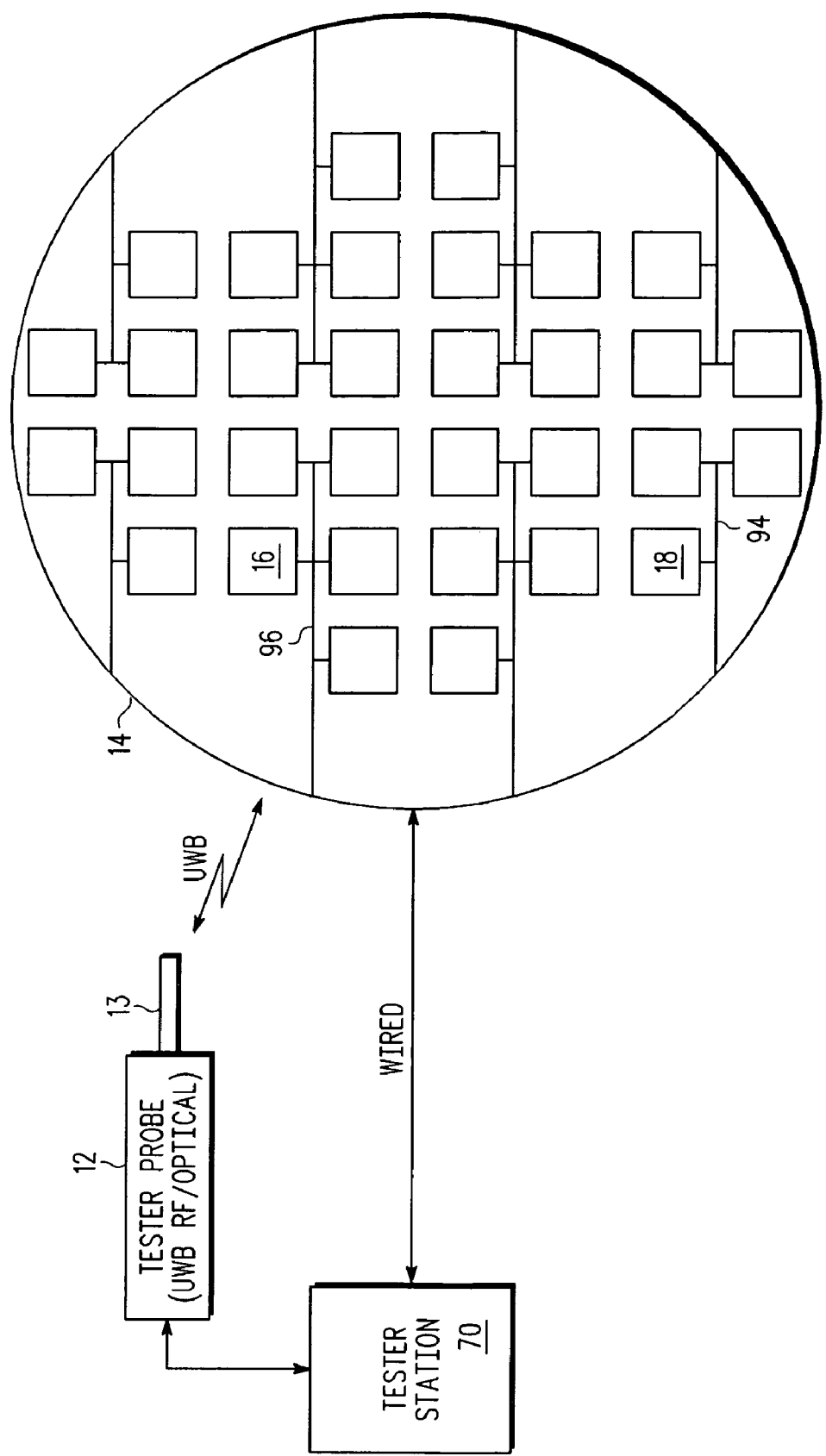
FIG. 3 shows a tester and wafer according to the embodiment.

Shown in FIG. 3 is wafer 14 and tester probe 12 in more pictorial form than as shown in FIG. 1. Also shown in FIG. 3 is tester station 70 having a data link with tester probe 12. Antenna 13 is shown extending from tester probe 12. Also shown in wafer are integrated circuits 16 and 18 as well as many other integrated circuits. All of the integrated circuits are shown having a wired connection to the periphery of wafer. For example, integrated circuits 16 and 18 are connected to wired connectors 96 and 94, respectively. Tester 70, during testing, has a wired connection to the periphery of wafer 14 so that there is a wired connection between each integrated circuit and tester station 70. This may be beneficial for providing power and ground to the integrated circuits during testing and may be used for other purposes as well. For example, multiple integrated circuits may be configured as a scan chain to provide output test values via the scan chain. FIG. 3 shows the carrierless UWB RF communication between the integrated circuits of wafer 14 and tester probe 12. Tester station 70 is used for providing testing signals and for processing results of the tests. Tester station may be programmed to run functions that arise as needed from the test results.

By now it should be appreciated that there has been provided an integrated circuit. The integrated circuit includes a packet switch having an optical transceiver, a first carrierless ultra wideband (UWB) radio frequency (RF) transceiver, and a packet processor which communicates data packets between the optical transceiver and the first carrierless UWB RF transceiver. The integrated circuit includes a first module which communicates via carrierless UWB RF signaling with the first carrierless UWB RF transceiver. The integrated circuit may be further characterized by the packet processor translating between carrierless UWB RF data packets and optical data packets. The integrated circuit may be further characterized by the packet switch further including a second carrierless UWB RF transceiver, the integrated circuit further comprising a second module which communicates via carrierless UWB RF signaling with the second carrierless UWB RF transceiver. The integrated circuit may be further characterized by the packet switch receiving, via the optical transceiver, a plurality of optical data packets, translating the plurality of optical data packets into a plurality of carrierless UWB RF data packets, and distributing the plurality of carrierless UWB RF data packets between the first and second carrierless UWB RF transceivers. The integrated circuit may be further characterized by the packet switch receiving, via the first and second carrierless UWB RF transceivers, a plurality of carrierless UWB RF data packets, translating the plurality of carrierless UWB RF data packets into optical data packets and multiplexing the plurality of optical data packets via the optical transceiver. The integrated circuit may be further characterized by each of the first UWB RF transceiver and the second UWB RF transceiver communicating with an external test probe having at least one antenna. The integrated circuit may be further characterized by the first UWB RF transceiver communicating with an external test probe having at least one antenna. The integrated circuit may be further characterized by the packet switch further comprising a transceiver control unit coupled to the optical transceiver and the first carrierless UWB RF transceiver to configure the optical transceiver and the first carrierless UWB RF transceiver. The integrated circuit may be further characterized by the first module comprising a processor core. The integrated circuit may be further characterized by the optical transceiver communicating with an external tester.

Also described is an integrated circuit. The integrated circuit includes a packet switch having an optical transceiver, a plurality of carrierless ultra wideband (UWB) radio frequency (RF) transceivers, and a packet processor which translates carrierless UWB RF data packets received via the plurality of carrierless UWB RF transceivers to optical data packets to be output by the optical transceiver and translates optical data packets received via the optical transceiver to carrierless UWB RF data packets to be output by one or more of the plurality of carrierless UWB RF transceivers. The integrated circuit also includes a plurality of processor cores, wherein each processor core communicates carrierless UWB RF data packets with a corresponding one of the plurality of carrierless UWB RF transceivers. The integrated circuit may be further characterized by one or more of the plurality of processor cores communicates carrierless UWB RF data packets with one or more other processor cores of the plurality of processor cores. The integrated circuit may be further characterized by one or more of the plurality of processor cores communicating carrierless UWB RF data packets directly with an external test probe having at least one antenna. The integrated circuit may be further characterized by the packet switch distributing the received and translated optical data packets among at least a subset of the plurality of carrierless UWB RF transceivers. The integrated circuit may be further characterized by the packet switch further comprising a transceiver control unit coupled to the optical transceiver and each of the plurality of carrierless UWB RF transceivers to configure the optical transceiver and the plurality of carrierless UWB RF transceivers.

Described also is method using an integrated circuit. The method includes a first module located on the integrated circuit providing a first plurality of carrierless UWB RF data packets to a first carrierless UWB RF transceiver. The method further includes a packet processor located on the integrated circuit and coupled to the first carrierless UWB RF transceiver translating the first plurality of carrierless UWB RF data packets into a first plurality of optical data packets. The method further includes communicating the first plurality of optical data packets external to the integrated circuit via an optical transceiver coupled to the packet processor. The method may further include the optical transceiver receiving a second plurality of optical data packets, the packet processor translating the second plurality of optical data packets into a second plurality of carrierless UWB RF data packets, providing, via the first carrierless UWB RF transceiver, at least a portion of the second plurality of carrierless UWB RF data packets to the first module. The method may further comprise a second module located on the integrated circuit providing a second plurality of carrierless UWB RF data packets to a second carrierless UWB transceiver, the packet processor translating the second plurality of carrierless UWB RF data packets into a second plurality of optical data packets, and communicating the second plurality of optical data packets external to the integrated circuit via the optical transceiver. The method may further comprise communicating a third plurality of carrierless UWB RF data packets between the first module and the second module. The method may further comprise communicating a second plurality of carrierless UWB RF data packets between the first carrierless UWB RF transceiver and an external test probe having at least one antenna.

Although the invention is described herein with reference to specific embodiments, various modifications and changes can be made without departing from the scope of the present invention as set forth in the claims below. For example, the tester was shown and described as testing all of the integrated circuits of the wafer simultaneously but it may be beneficial to not test all of them simultaneously. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. An integrated circuit comprising:
   a packet switch having an optical transceiver, a first carrierless ultra wideband (UWB) radio frequency (RF) transceiver, an antenna, and a packet processor which communicates data packets between the optical transceiver and the first carrierless UWB RF transceiver; and
   a first module which communicates via carrierless UWB RF signaling with the first carrierless UWB RF transceiver, wherein the first module includes a plurality of processing cores, and each of the processing cores include a corresponding antenna.

2. The integrated circuit of claim 1, wherein the packet processor translates between carrierless UWB RF data packets and optical data packets.

3. The integrated circuit of claim 1, wherein the packet switch further includes a second carrierless UWB RF transceiver, the integrated circuit further comprising:
   a second module which communicates via carrierless UWB RF signaling with the second carrierless UWB RF transceiver.

4. The integrated circuit of claim 3, wherein the packet switch receives, via the optical transceiver, a plurality of optical data packets, translates the plurality of optical data packets into a plurality of carrierless UWB RF data packets, and distributes the plurality of carrierless UWB RF data packets between the first and second carrierless UWB RF transceivers.

5. The integrated circuit of claim 3, wherein the packet switch receives, via the first and second carrierless UWB RF transceivers, a plurality of carrierless UWB RF data packets, translates the plurality of carrierless UWB RF data packets into optical data packets and multiplexes the plurality of optical data packets via the optical transceiver.

6. The integrated circuit of claim 3, wherein each of the first UWB RF transceiver and the second UWB RF transceiver communicates with an external test probe having at least one antenna.

7. The integrated circuit of claim 1, wherein the first UWB RF transceiver communicates with an external test probe having at least one antenna.

8. The integrated circuit of claim 1, wherein the packet switch further comprises a transceiver control unit coupled to the optical transceiver and the first carrierless UWB RF transceiver to configure the optical transceiver and the first carrierless UWB RF transceiver.

9. The integrated circuit of claim 1, wherein the first module comprises a processor core.

10. The integrated circuit of claim 1, wherein the optical transceiver communicates with an external tester.

11. An integrated circuit, comprising:
a packet switch having an optical transceiver, a plurality of carrierless ultra wideband (UWB) radio frequency (RF) transceivers, and a packet processor which translates carrierless UWB RF data packets received via the plurality of carrierless UWB RF transceivers to optical data packets to be output by the optical transceiver and translates optical data packets received via the optical transceiver to carrierless UWB RF data packets to be output by one or more of the plurality of carrierless UWB RF transceivers; and
a plurality of processor cores, wherein each processor core communicates carrierless UWB RF data packets with a corresponding one of the plurality of carrierless UWB RF transceivers.

12. The integrated circuit of claim 11, wherein one or more of the plurality of processor cores communicates carrierless UWB RF data packets with one or more other processor cores of the plurality of processor cores.

13. The integrated circuit of claim 11, wherein one or more of the plurality of processor cores communicates carrierless UWB RF data packets directly with an external test probe having at least one antenna.

14. The integrated circuit of claim 11, wherein the packet switch distributes the received and translated optical data packets among at least a subset of the plurality of carrierless UWB RF transceivers.

15. The integrated circuit of claim 11, wherein the packet switch further comprises a transceiver control unit coupled to the optical transceiver and each of the plurality of carrierless UWB RF transceivers to configure the optical transceiver and the plurality of carrierless UWB RF transceivers.

16. A method comprising:
providing, by a first module located on an integrated circuit, a first plurality of carrierless UWB RF data packets to a first carrierless UWB RF transceiver;
translating, by a packet processor located on the integrated circuit and coupled to the first carrierless UWB RF transceiver, the first plurality of carrierless UWB RF data packets into a first plurality of optical data packets; and
communicating the first plurality of optical data packets external to the integrated circuit via an optical transceiver coupled to the packet processor.

17. The method of claim 16, further comprising:
receiving, by the optical transceiver, a second plurality of optical data packets;
translating, by the packet processor, the second plurality of optical data packets into a second plurality of carrierless UWB RF data packets; and
providing, via the first carrierless UWB RF transceiver, at least a portion of the second plurality of carrierless UWB RF data packets to the first module.

18. The method of claim 16, further comprising:
providing, by a second module located on the integrated circuit, a second plurality of carrierless UWB RF data packets to a second carrierless UWB transceiver;
translating, by the packet processor, the second plurality of carrierless UWB RF data packets into a second plurality of optical data packets; and
communicating the second plurality of optical data packets external to the integrated circuit via the optical transceiver.

19. The method of claim 18, further comprising:
communicating a third plurality of carrierless UWB RF data packets between the first module and the second module.

20. The method of claim 16, further comprising:
communicating a second plurality of carrierless UWB RF data packets between the first carrierless UWB RF transceiver and an external test probe having at least one antenna.

* * * * *